June 13, 1933. W. A. ENGLISH 1,914,012
REVERSIBLE FILTERING APPARATUS
Filed Aug. 10, 1931
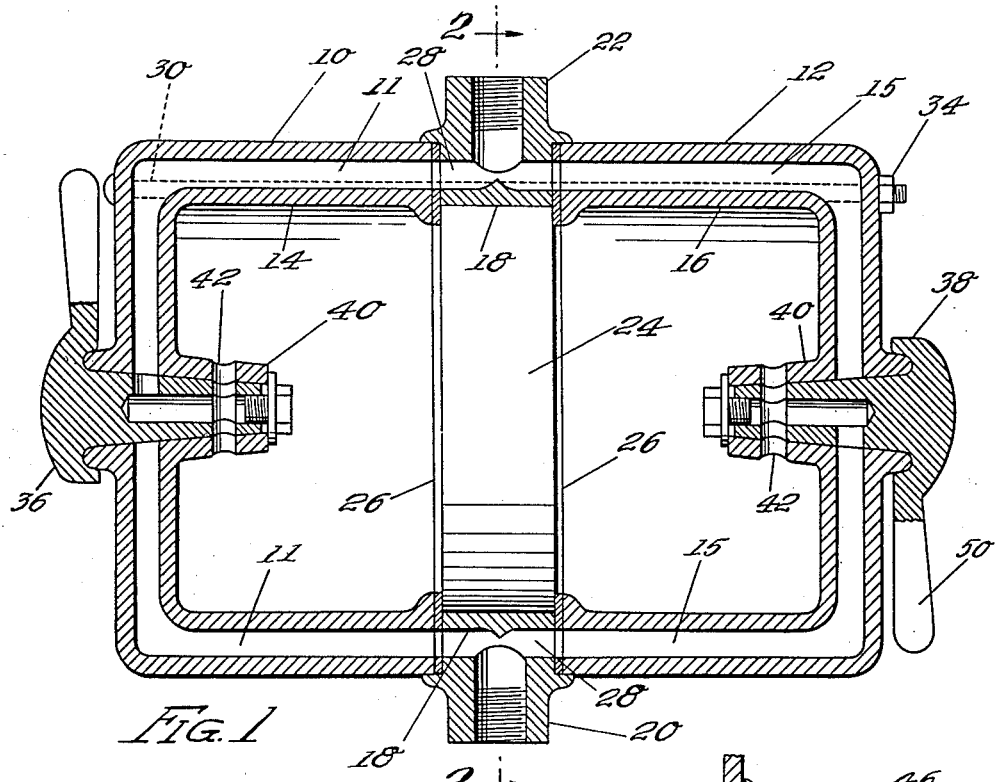
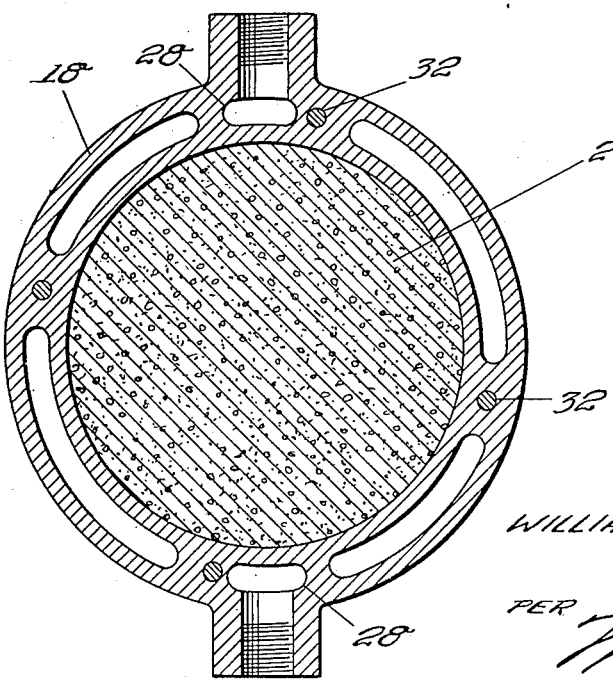
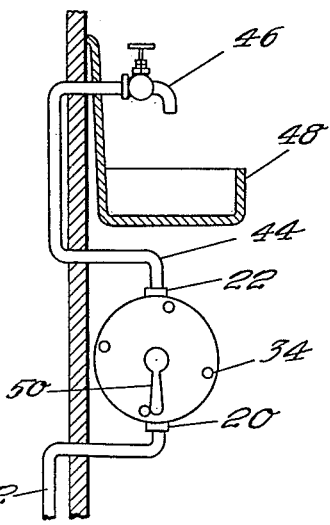
WILLIAM A. ENGLISH
INVENTOR
PER *Minier and Fihe*
ATTORNEYS Patented June 13, 1933

1,914,012

UNITED STATES PATENT OFFICE

WILLIAM A. ENGLISH, OF VAN NUYS, CALIFORNIA

REVERSIBLE FILTERING APPARATUS

Application filed August 10, 1931. Serial No. 556,193.

This invention relates to an improved reversible filtering apparatus, and has for one of its principal objects the provision of a filtering device, the flow of liquid through which can be readily reversed for cleaning purposes.

One of the important objects of this invention is to provide in a filter or the like a removable filter element, which, however, when installed, can be retained in position for a considerable length of time without necessitating removal for cleaning.

Still another and further important object of this invention resides in the provision of an improved filter device through which liquid may be forced in either one of two directions, whereby the same can be readily cleaned by reversing the flow of liquid therethrough, and after such cleaning, can be used in this position or by again reversing.

Another and still further important object of the invention is the provision in a filter of means for reversing the flow of water through a filtering stone or the like without shifting the position of the stone in any way.

Other and further important objects of the invention will be apparent from the disclosures in the accompanying drawing and following specification.

The invention, in a preferred form, is illustrated in the drawing and hereinafter more fully described.

In the drawing:

Figure 1 is a vertical sectional view of the improved reversible filter of this invention.

Figure 2 is also a sectional view taken on the line 2—2 of Figure 1.

Figure 3 is an elevation, showing the application of the improved filter of this invention to the ordinary water faucet used in homes or the like.

As shown in the drawing:

The reference numerals 10 and 12 indicate generally the two portions of an outer casing of a filtering device constructed in accordance with the principles of this invention. The reference numerals 14 and 16 indicate respectively the corresponding inner portions of the same device, there being ports or the like 11 and 15 between the walls for proper flow of water or other liquid therethrough.

Adapted to be fitted between the edges of these shells is a central element 18 in the form of an annular ring, having an inlet port 20 and an outlet port 22. Into the central portion of this annular ring 18 is fixed a filtering stone or the like as illustrated at 24, this being maintained in non-leakable position between the shells 10, 12, etc. by means of gaskets or the like 26.

From an inspection of Figure 2, it will be noted that the annular element 18 is formed with passages 28 between the walls thereof which provide for the free flow of water into and out of the inlet and outlet ports 20 and 22, and into the passages 11 and 15 in the shell sections.

The shells 10, 12, etc. are held together by means of bolts or the like 30 passing through aligned openings therein, and also through corresponding openings 32 in the annular member 18. The bolts are held in position by means of nuts or the like 34, and by drawing up on these nuts, a tight fit is obtained between the sections.

In the end of each of the shells 10, 12, etc. is fitted a faucet or cock as shown at 36 and 38 respectively, each faucet having a handle as indicated, and having a conical valve or flow-regulating element extending into the interior of the corresponding chamber. Each conical flow-regulating element is fitted into a corresponding extension 40 which extension has a series of openings 42 therein for the free passage of liquid therethrough.

In operation, water from a main line or the like 42 flows into the port 20 at the bottom of the filter casing, thence through the port 28 and channel 15 between the shell walls to the valve 38, which value, when in the position shown in Figure 1, admits the water to the interior of the chamber as outlined by the walls 16 and one face of the stone 24.

The water or other liquid is then forced through the stone 24, and out through the ports 42 in the valve 36, thence upwardly through the channel 11 between the upper shell walls 10 and 14 through the port 28 and the outlet 22, whence the same flows into a supply pipe 44 leading to a faucet or the like 46 positioned above a sink or similar device 48.

Whenever it is desired to clean the filter, the positions of the handles 50 on the valves 36 and 38 are reversed, allowing the water to flow in through the cock 36 and thence through the stone 24 in a reverse direction, and out through the cock 38 and thence to the faucet 46. Obviously, this water is quite dirty at first, but after the chamber 16 has been cleaned, the water is again clear, and the operator may then continue to use the filter in this position or may again reverse the flow, if he desires.

I am aware that many changes may be made and numerous details of construction varied throughout a wide range without departing from the principles of this invention, and I, therefore, do not purpose limiting the patent granted hereon otherwise than as necessitated by the prior art.

I claim as my invention:

1. A reversible filter, including a filtering element, a chamber comprising a one-piece cup-like member on each side of the filtering element, an inlet and an outlet, passages connecting said chambers with said inlet and outlet and interchangeable valve means in each, and forming a part of the passages for reversing the flow of liquid through the chambers, each of the said valves projecting into the interior of the chambers.

2. A reversible filter, including a filtering element, a chamber comprising a one-piece cup-like member on each side of the filtering element, an inlet and an outlet, passages connecting said chambers with said inlet and outlet and interchangeable valve means in each, and forming a part of the passages for reversing the flow of liquid through the chambers, each of the said valves projecting into the interior of the chambers, and means for reversing the operating position of the valves.

3. A reversible filter, including a filtering element, a chamber comprising a one-piece cup-like member on each side of the filtering element, an inlet and an outlet, passages connecting said chambers with said inlet and outlet and interchangeable valve means in each, and forming a part of the passages for reversing the flow of liquid through the chambers, each of the said valves projecting into the interior of the chambers, and means for reversing the operating position of the valves, said means comprising an exterior operating handle on each valve.

4. A reversible filter, including a filtering element, a chamber comprising a one-piece cup-like member on each side of the filtering element, an inlet and an outlet, passages connecting said chambers with said inlet and outlet and interchangeable valve means in each, and forming a part of the passages for reversing the flow of liquid through the chambers, each of the said valves projecting into the interior of the chambers, and means for reversing the operating position of the valves, said means comprising an exterior operating handle on each valve, said valves being capable of independent operation.

5. A reversible filter, including a filtering element, a chamber comprising a one-piece cup-like member on each side of the filtering element, an inlet and an outlet, passages connecting said chambers with said inlet and outlet and interchangeable valve means in each, and forming a part of the passages for reversing the flow of liquid through the chambers, each of the said valves projecting into the interior of the chambers, and means for reversing the operating position of the valves, said means comprising an exterior operating handle on each valve, said valves being capable of independent operation, but adapted to be moved in unison.

In testimony whereof I affix my signature.

WILLIAM A. ENGLISH.